United States Patent

[11] 3,590,415

| | | |
|---|---|---|
| [72] | Inventor | Yoichi Mori<br>Yokohama, Japan |
| [21] | Appl. No. | 889,183 |
| [22] | Filed | Dec. 30, 1969 |
| [45] | Patented | July 6, 1971 |
| [73] | Assignee | Nissan Motor Company Limited<br>Kangawa-Ku, Yokohama, Japan |
| [32] | Priority | Jan. 9, 1969 |
| [33] | | Japan |
| [31] | | 44/1467 |

[54] AUTOMOTIVE WINDSHIELD WIPER
6 Claims, 4 Drawing Figs.

[52] U.S. Cl............................................................ 15/250.21,
15/250.23, 15/250.25, 15/250.3
[51] Int. Cl............................................................ A471 1/00,
B60s 1/02
[50] Field of Search............................................ 15/250.13,
250.21, 250.23, 250.25, 250.29, 250.30

[56] References Cited
UNITED STATES PATENTS

| 1,964,109 | 6/1934 | Cusset | 15/250.23 |
| 2,326,231 | 8/1943 | Kraemer | 15/250.23 |
| 2,738,536 | 3/1956 | Spencer, Jr. | 15/250.23 |

FOREIGN PATENTS

| 645,789 | 6/1937 | Germany | 15/250.23 |

*Primary Examiner*—Peter Feldman
*Attorney*—John Lezdey

ABSTRACT: An automotive windshield wiper oscillating along a substantially straight horizontal trochoidal curve. The wiper blade sweeps practically the total area of one-half of the windshield. The trochoidal curve is drawn by a crank arm oscillating about a fixed point and a wiper arm mounted pivotally on the periphery of the crank arm, oscillating in a direction opposite to the oscillation of the crank arm. A quadric chain mechanism is formed by the wiper arm and hingedly connected links to hold the wiper blade in a position substantially perpendicular to the horizontal line.

AUTOMOTIVE WINDSHIELD WIPER

This invention relates to a windshield wiper assembly of an automotive vehicle and more particularly to a mechanically driven wiper with a single wiper blade oscillating along a substantially straight horizontal line. The wiper blade is at all times held in a position substantially perpendicular to the horizontal line and is thus capable of sweeping practically the total area of one-half of the windshield. With two wiper assemblies practically the total area of the windshields may be swept, enlarging the field visible to the driver of the vehicle during rain and snowfalls.

The conventional wiper blades usually sweep the windshield in a semicircular or semiarcuate pattern and considerably large areas of the windshield in the upper-right and -left corners and in the center are not swept, limiting the field visible to the driver.

It is an object of this invention to eliminate the disadvantages of the conventional windshield wiper by providing a new and novel windshield wiper having a wiper blade which is capable of sweeping practically the total area of one-half of the windshield. This is accomplished by moving the wiper blade along a trochoidal curve.

It is another object of this invention to provide a driving mechanism for the new and novel windshield wiper. The features and disadvantages of this invention will become apparent from the following description perused in conjunction with the accompanying drawings, in which.

A trochoidal curve is generally known as a trace of a point on the radius of a circle rolling on the outer or inner periphery of a base circle in circumscribing relationship; the former is termed a hypotrochoid and the latter an epitrochoid.

Figure 1:
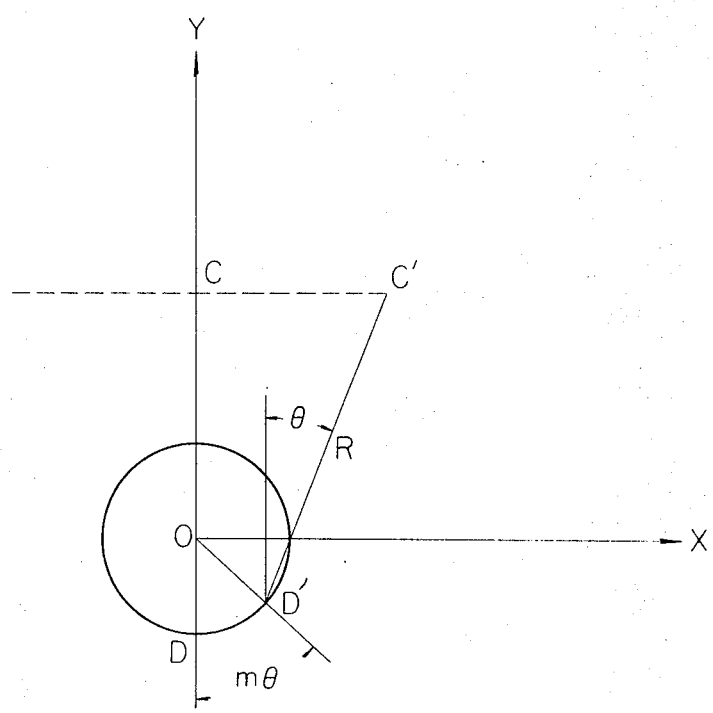
FIG. 1 illustrates the principle of the wiper blade tracing a trochoidal curve according to the present invention.

A trochoidal curve, as adopted for the motion of a windshield wiper, can be drawn by rotating a crank arm around a fixed center point and simultaneously a wiper arm in the opposite direction with the end of the crank arm as a center point. In FIG. 1 the crank arm OD of a unit length 1 is shown to rotate counterclockwise around center point 0. A wiper arm CD of a length R rotates clockwise around center point D. Both the crank arm and the wiper arm are initially superimposed on the y-axis. When the crank arm rotates an angle $m\theta$ the wiper arm R rotates an angle $\theta$, $m$ being the ratio of the angles. The crank arm is now positioned on OD' and the wiper arm on D'C'. The coordinates of point C' are expressed as:

$$x = \sin m\theta + R \cdot \sin \theta \quad\quad (1)$$
$$y = -\cos m\theta + R \cdot \cos \theta \quad\quad (2)$$

At the starting point $\theta=0$ and the coordinates of point C are:
$x=0$
$y=R-1$.

When the wiper arm oscillates between the extreme limits and $\theta=\theta_1$, in order that the y coordinate remains constant, the following equation should hold:
$$y_1 = R \cdot \cos\theta - \cos m\theta_1 = R-1 \quad\quad (3)$$
hence
$$R = (\cos m\theta_1 - 1)/(\cos\theta_1 b/1) \quad\quad (4)$$

Consequently, the wiper blade will be moved horizontally, if the length of the wiper arm is determined according to equation (4). Assuming that $m=2, \theta_1=50°$ and the length of the crank arm $=1$, then the length of $R=3.286$.

Figure 2:
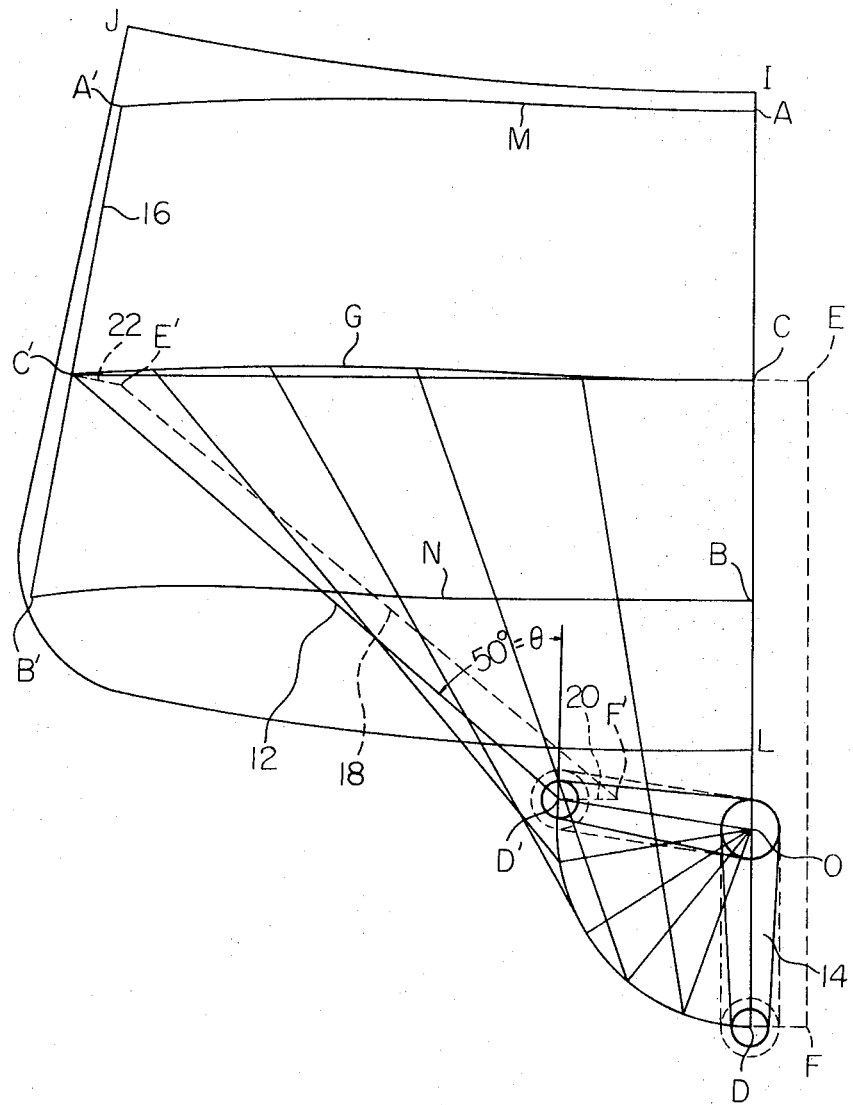
FIG. 2 is a schematic front view of the right half of the windshield showing the wiper in various positions.

FIG. 2 shows the right half of the windshield and wiper arm in various positions according to the present invention. The left half is a mirror picture of the right half and is not herein illustrated. In this illustration $m=2$ and $\theta_1=50°$. The contour of the right half of the windshield as shown is defined by the lines designated by I-J-K-L. The wiper arm 12 rotates around its center point D in the periphery of the crank arm 14 which in turn rotates around the center point 0 in an opposite direction. When the arms 12 and 14 are at the centerline limit, they are superimposed on the line CD and when at the extreme outward limit the wiper arm 12 is on the line D'C' and the crank arm 14 on the line OD'. The wiper blade 16 is kept in position substantially perpendicular to the horizontal line at all times by a quadric chain mechanism c'-D'-E'-F' comprising the wiper arm 12, an auxiliary link 18, a first connecting link 20 and a second connecting link 22, as will be discussed later.

If the length of the wiper arm 12 in relation to the length of the crank arm 14 is determined according to the equation (4) mentioned above, the periphery or end point C of the wiper arm 12 will be oscillated on a substantially straight line CGC' during the sweep. Since the wiper blade 16 is kept in a position described above by the quadric chain mechanism C'-D'-E'-F', the upper tip of the wiper blade draws a substantially straight line AMA' and the lower tip similarly a line BNB'. The total area swept by the wiper blade is thus a near square with corner points ABB'A'.

Means for deviating from a near square wiping area may be provided by varying the relative lengths of the connecting links of the quadric chain mechanism in order to follow the contour of the windshield at the extreme outward limit. As an example, shortening the connecting link 22 in relation to the link 20 causes the wiper blade to incline from the position described above at the extreme outward limit and it may be parallel with the windshield edge.

Figure 3:
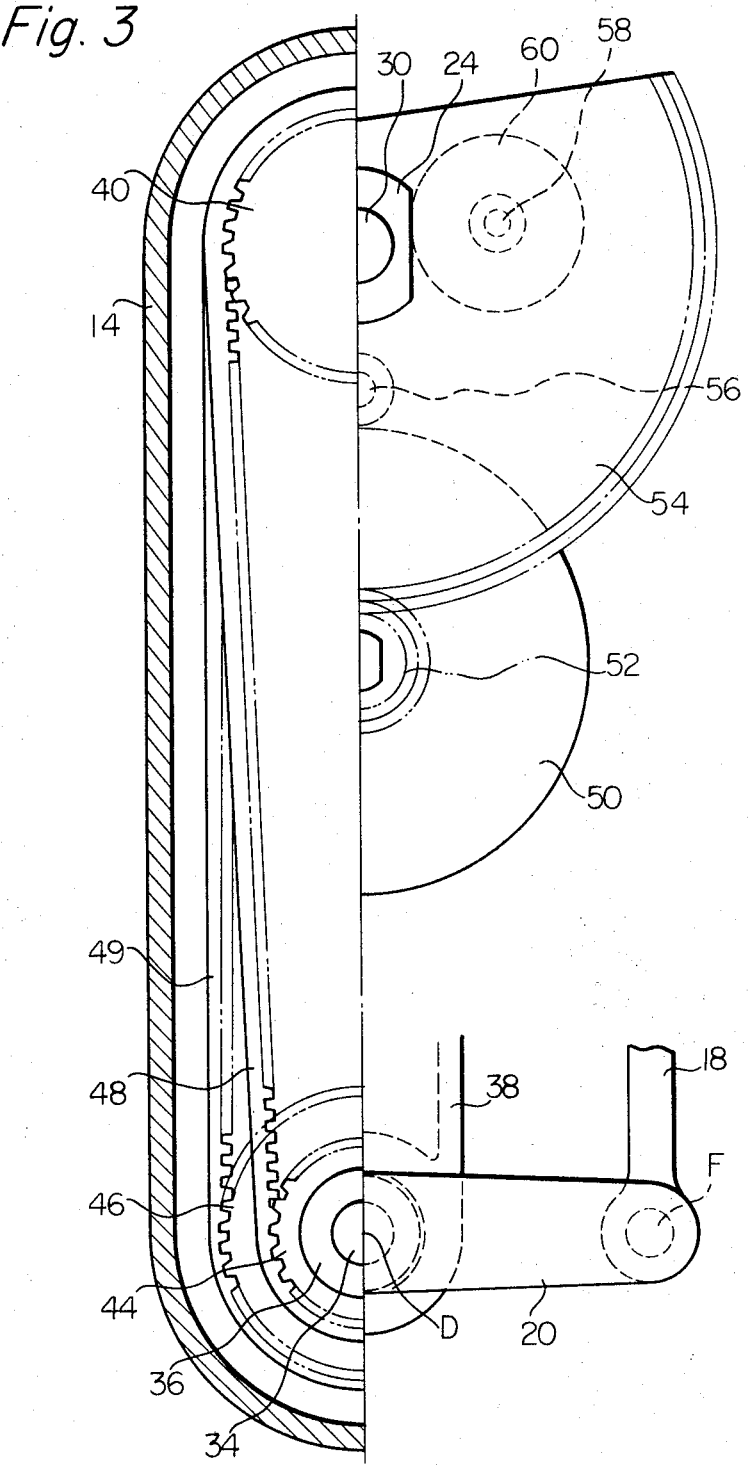
FIG. 3 is a partial sectional plan view of the drive mechanism of the windshield wiper shown in FIG. 2.
Figure 4:
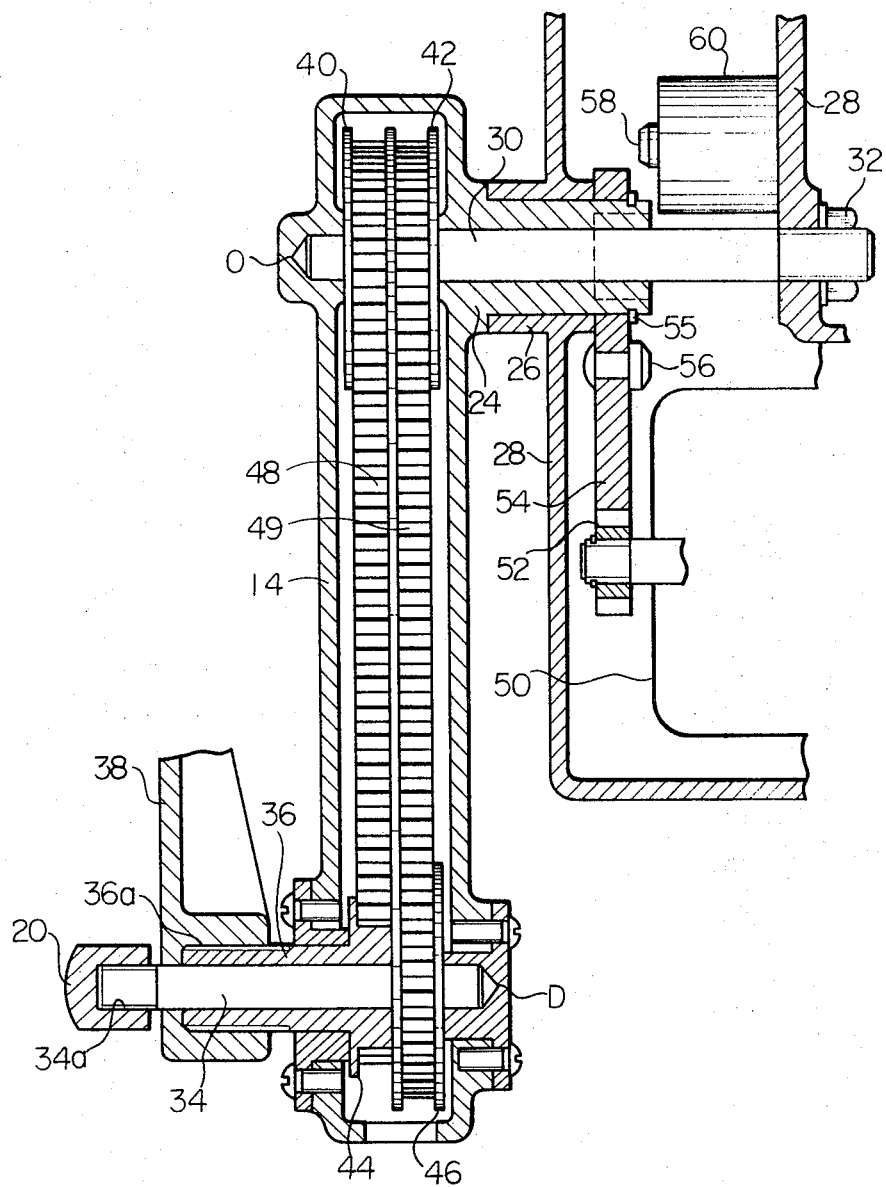
FIG. 4 is a cutaway view partially in section of the drive mechanism of FIG. 3.

FIGS. 3 and 4 show a preferred embodiment of the present invention. The crank arm 14 is shown to be integral with a first sleeve shaft 24, which is rotatably inserted into a boss 26 formed in a casing 28. The first sleeve shaft 24 is also rotatably supported by a stationary crank arm shaft 30, which is secured by a nut 32 to the casing 28. The axis of the crank arm shaft 30 corresponds to point 0 in FIGS. 1 and 2. A wiper arm shaft 34 is rotatably fitted into the other end of the crank arm 14 corresponding to point D in FIGS. 1 and 2. A second sleeve shaft 36 is fitted rotatably on the wiper arm shaft 34. An extended portion 36a of the second sleeve shaft 36 is serrated externally to fit into the internal serrations of the connecting end 38 of the wiper arm 14, as is conventional. Similarly the extruding end 34a of the wiper arm shaft 34 is externally serrated to fit into the internal serrations of the connecting end of the link 20.

First and second externally axially grooved, similarly sized drive pulleys 40 and 42, respectively, are fitted and secured fixedly to the crank arm shaft 30. It should be noted that in fact these drive pulleys 40 and 42 remain stationary since they are secured to the crank arm shaft 30 which does not rotate. Instead the crank arm 14 moves relative to the drive pulleys 40 and 42 which then act as sources which turn the rotatable pulleys described hereinafter.

A third externally axially grooved wiper arm pulley 44 is fixedly or integrally secured to the independently rotatable sleeve shaft 36 and a fourth pulley 46 which is also externally axially grooved is similarly secured to the also independently rotatable wiper arm shaft 34. A first internally laterally grooved belt 48 is wound around and in mesh with the pulleys 40 and 44.

A motor 50 with a fixed drive pinion 52 meshing with a sector gear 54, secured by a snap ring 55 to a projecting end of the first sleeve shaft 24, provides the means for the rotation of the crank arm 14 and the wiper arm 12. The sector gear 54 is provided with a first contact button 56 which, when in contact with a second contact button 58 of a first limit switch 60, reverses the direction of the rotation of the motor 50. When the wiper arm 12 returns to the other limit, the contact button 56 comes in touch with a third contact button of a second limit switch (not shown), which again reverses the direction of the motor 50 and the wiper arm 12.

When the motor 50 is actuated and the crank arm 14 rotates the first drive pulley 40, then the belt 48 turns the wiper arm pulley 44 causing the wiper arm 12 to move. A second internally laterally grooved belt 49 is wound around and in mesh with the pulleys 42 and 46. Similarly, when the motor 50 is actuated and the crank arm 14 rotates, the second drive pulley 42 turns the connecting link pulley 46 causing the connecting link 20 to rotate. The pulleys 42 and 46 are of the same size so that any cam arm rotation causes a rotation of the connecting link 20 of the same magnitude but in the opposite direction. The crank arm 14 is herein shown to rotate 100° and therefore the connecting link 20 also rotates 100° but in the opposite direction and remains horizontal independently of the angle of rotation of the crank arm 14.

The drive pulleys 40 and 42 are of the same size but the wiper arm pulley 44 is shown as smaller than the two. When the crank arm 14 rotates an angle of $\alpha$, the first drive pulley 40 in situ assumes a relative position angularly deviated at $-\alpha$ from its original position relative to the crank arm 14. As a result the wiper arm pulley 44 and the wiper arm 12 rotate a larger angle than $\alpha$ in relation to the crank arm 12, and in the opposite direction. If the numbers of teeth of the pulleys 40 and 44 are $N_o$ and $N_1$, respectively, the pulley 44 and the wiper arm 12 rotate an angle $-\alpha x(N_o/N_1)$ in relation to the crank arm 14. Considering the crank arm 14 has already turned about the shaft 30, the pulley 44 now has a position turned at $\alpha[1-(N_o/N_1)]$ from its original position. The rotation ratio $m$ of the wiper arm to the crank arm in the opposite direction as previously defined is thus:

$$m=-/[1-(N_o/N_1)]=AN_1/(N_o-N_1)$$

hence, $$N_1=m/(m+1)]N_o.$$

If $m=2$ (FIG. 2), then $N_1=(2/3)N_o$. Therefore, if the number of teeth $N_o$ of the pulley 46 is reduced to two-thirds for the pulley 44, the wiper arm 12 rotates 50° in relation to the y-axis while the crank arm rotates 100° and the wiper arm 12 moves from line DC to D'C' (FIG. 2).

If the relative lengths of the crank and wiper arms 14 and 12, respectively, are determined according to the equation (4), the end point C of the wiper arm 12 moves generally horizontally as described previously. When the wiper arm 12 moves from the center limit to the outward limit of point C' (FIG. 2) and the crank arm is on line OD', the contact button 56 on the sector gear 54 (FIG. 4) presses the contact button 58 of the limit switch 60, causing the motor 50 to change its direction of rotation and the wiper arm 12 returns to the center line CD. At this point the contact button 56 presses a third contact button of a second limit switch (not shown) which again reverses the direction of rotation of the motor and the wiper arm, thus providing means for oscillating the windshield wiper assembly.

Having thus described the present invention, it is understood that a horizontally sweeping windshield wiper and drive mechanism offer great advantages over the conventional semicircularly or semiarcuately oscillating wiper and lessens the hazards otherwise caused by a limited visible field when driving during rain and snowfalls, contributing to safer driving conditions.

I claim:

1. An automotive windshield wiper assembly comprising a crank arm rotatably supported on a stationary crank arm shaft, a wiper arm rotatably supported on the periphery of said crank arm, the relative length of said wiper arm to the unit length 1 of said crank arm being determined according to the equation $R=(\cos m1-1)/(\cos\theta_1-1)$, in which R is said relative length of said wiper arm to said unit length 1 of said crank arm, $m$ is the ratio of the angles formed by said crank arm and said wiper arm when rotated and $\theta_1$ is the angle formed by said rotation of said wiper arm, means to rotate said crank arm, means to rotate said wiper arm in a direction opposite to the direction of said crank arm and interdependently of said crank arm, a wiper blade mounted on the periphery of said wiper arm, a mechanism to maintain said wiper blade in a position substantially perpendicular to a horizontal line, means to incline said wiper blade from said position when reaching the extreme outward limit of the sweep and means to oscillate said windshield wiper assembly, thereby moving said wiper blade along a substantially horizontal path.

2. An automotive windshield wiper assembly according to claim 1, in which said mechanism to maintain said wiper blade in a position substantially perpendicular to the horizontal line comprises a quadric chain mechanism formed by said wiper arm, an auxiliary link, a first and a second connecting link, the drive end of said wiper arm having a portion of internal serrations into which an externally serrated portion of a second sleeve shaft fits, a second externally axially grooved stationary pulley, mounted on said stationary crank arm shaft, a fourth externally axially grooved pulley mounted on an independently rotatable wiper arm shaft, said second and fourth pulleys being of similar size, a second internally laterally grooved belt meshed around said second and fourth pulleys, said wiper arm shaft having an externally serrated portion fitting into a portion of internal serrations of said first connecting link.

3. An automotive windshield wiper assembly according to claim 2, in which said means to incline said wiper blade comprises said quadric chain mechanism in which said second connecting link is shorter than said first connecting link.

4. An automotive windshield wiper assembly according to claim 1, in which said means to rotate said crank arm comprises a first sleeve shaft integral with said crank arm and inserted rotatably in a boss formed in a casing, said first sleeve shaft being rotatably engaged with said stationary crank shaft mounted fixedly on said casing, a sector gear secured to said first sleeve shaft by a snap ring and meshing with a fixed pinion of a motor.

5. An automotive windshield wiper assembly according to claim 1, in which said means to rotate said wiper arm comprises a first externally axially grooved stationary pulley mounted on said stationary crank arm shaft, and of the same size as said second and fourth pulleys, a third externally axially grooved pulley fixedly or integrally secured to an independently rotatable second sleeve shaft and having a smaller diameter than said first pulley, a first internally laterally grooved belt meshed around said first and third pulleys, an externally serrated portion of said second sleeve shaft fitting into a portion of internal serrations of said drive end of said wiper arm.

6. An automotive windshield wiper assembly according to claim 1, in which said means to oscillate said windshield wiper assembly comprises a first contact button mounted on said sector gear, a second contact button mounted on a first limit switch and a third contact button mounted on a second limit switch.